United States Patent [19]

Felle et al.

[11] Patent Number: 4,942,415

[45] Date of Patent: Jul. 17, 1990

[54] SHUTTER FOR A PHOTOGRAMMETRIC CAMERA

[75] Inventors: Karl Felle; Heinz Krastel, both of Oberkochen, Fed. Rep. of Germany

[73] Assignee: Carl-Zeiss-Stiftung, Heidenheim/Brenz, Fed. Rep. of Germany

[21] Appl. No.: 400,686

[22] Filed: Aug. 30, 1989

[30] Foreign Application Priority Data

Nov. 5, 1988 [DE] Fed. Rep. of Germany ....... 3837682

[51] Int. Cl.$^5$ .......................... G03B 7/00; G03B 9/20
[52] U.S. Cl. .................................. 354/234.1; 354/65; 354/254
[58] Field of Search ................ 354/65, 66, 234.1, 254

[56] References Cited

U.S. PATENT DOCUMENTS 2,926,582  3/1960  Sonnberger ......................... 354/254
3,735,687  5/1973  Park ................................... 354/254
4,616,911 10/1986  Zeth et al. ............................ 354/66

FOREIGN PATENT DOCUMENTS 3514433  1/1986  Fed. Rep. of Germany .
 159222  2/1983  German Democratic Rep. .

Primary Examiner—Michael L. Gellner
Attorney, Agent, or Firm—Walter Ottesen

[57] ABSTRACT

The invention is directed to a shutter wherein the rotary discs thereof are accelerated out of a standstill start position for each exposure operation and are again brought to standstill at the end of the exposure operation. The start position is computed such that a constant access time results for all exposure times. An electronic control circuit for the shutter includes a position-control circuit and a speed-control circuit. During each exposure operation, the drive for the rotary discs of the shutter are switched between the two control loops.

7 Claims, 2 Drawing Sheets

SHUTTER FOR A PHOTOGRAMMETRIC CAMERA

BACKGROUND OF THE INVENTION

In photogrammetric aerial cameras, continuously rotating disc shutters are still utilized for generating short exposure times with high lens shutter efficiency since with shutters of this type, the relatively large shutter aperture surfaces needed for this application can be covered rapidly. Rotary disc shutters mostly comprise two disc pairs which are interconnected with a gear transmission and rotate at different speeds. The openings in the discs then come into coincidence periodically with each multiple of both rotation times with the multiple being determined by the transmission ratio. Of the shutter apertures which then are provided, only individual ones thereof are, however, cleared by the actuation of an additional selection disc. A shutter exemplary of this type is disclosed in U.S. Pat. No. 2,926,582.

It is a disadvantage in shutters of this type that the access time $t_z$ is not constant. The access time is the delay time between the actuation of the shutter and the next possible actual exposure time point. Instead of being constant, this access time $t_z$ is dependent upon the speed of the discs or the desired exposure time. This becomes especially noticeable for its undesirable effect for long exposure times, that is, it becomes especially noticeable at low rotational speeds. The access time is dependent upon the instantaneous position in which the disc pairs happen to be and can amount approximately up to a multiple of 200 times the exposure time. For this reason, values of the access time of up to two seconds can result for long exposure times.

However, long exposure times are gaining significance with aerial cameras especially because of the increased use of high resolution films which, however, are less sensitive; this, in turn, is caused by the introduction of devices for compensating for the loss of definition of image movement. It is precisely here that long and non-constant access times are disturbing since precise image overlap values can no longer be obtained.

A great many attempts at a solution are known wherein the attempt was made to shorten the access time in rotating leaf-type shutters or to at least reduce the influence of the overlapping. Accordingly, the suggestion is made in U.S. Pat. No. 4,616,911 that the rotational speed of the rotary discs of the shutter is individually adjusted so that the exposure interval is always a whole-number multiple of the time interval between two possible exposure points of the shutter. Although the fluctuations of the access time are reduced in this manner, long access times result however as previously; that is, this process limits the time of exposure.

For solving the above-mentioned problem, German published patent application 3,514,433 teaches that the magnitude of the sector cutout of the rotary discs can be mechanically changed. However, this can be realized only with relatively large structural complexity.

East German Patent 159,222 discloses a shutter wherein the rotary discs are not coupled by gearing; rather, the rotary discs are individually synchronously rotated via two separate drives with the sector cutouts in the two discs being, however, displaced with respect to each other. To clear the beam path, one disc is accelerated for a short time via an external signal so that the sector cutouts are brought into coincidence with each other. The disc is again reset after the exposure.

Aside from a relatively high complexity on the drive side, precise exposure times can be obtained only with difficulty with this arrangement.

SUMMARY OF THE INVENTION

It is an object of the invention to provide a shutter for a photogrammetric camera wherein the shortest possible access times are obtained which are constant and independent of the exposure time.

The shutter for a photogrammetric camera of the invention includes: rotatably mounted disc means for defining a shutter opening; drive means for rotatably driving the disc means for each exposure operation by accelerating the disc means out of a standstill start position thereof; angle encoder means for measuring the start position of the disc means; a control circuit for providing a signal indicative of a desired exposure time $t_B$; and, a device operatively connected to the drive means for displacing the start position of the disc means in dependence upon the signal so as to cause the access time $t_z$ between the start $t_o$ of the acceleration and the exposure for different adjustable exposure times ($t_{B1}$, $t_{B2}$) to have a substantially constant value.

According to the invention, the shutter is pulse-driven so that no continuous rotation of the discs occurs. Instead, with each exposure, the shutter is accelerated out of a start position, in which the discs cover the opening, to the speed corresponding to the desired exposure time. After the opening is cleared, the discs are braked and again returned to the start position without the sectors of the disc producing an additional clearing of the opening.

The realization of this solution has as a premise that the shutter, for the shortest exposure time, can be accelerated up to the required speed along the longest path available between two openings and thereafter can be braked again. This can be realized utilizing the following: high-capacity drive motors such as direct-current permanent-magnet motors equipped with samarium-cobalt magnets as well as discs having a low moment of inertia and a ratio of closure angle range to opening angle range of the sectors as high as possible.

A high ratio of closure to opening ranges can be achieved by utilizing discs with a large diameter. However, this produces a relatively large inertial moment of the shutter and therefore requires powerful drives. As in the case of rotary disc shutters with continuously rotating discs, it is advantageous to utilize two disc pairs having a smaller diameter and which are connected with each other via a speed-transforming transmission and therefore do not open with each rotation and instead open only at each multiple of the revolutions for both disc pairs with this multiple being predetermined by the transmission ratio.

What is decisive for the invention is that according to each desired exposure time, the start position of the discs is so shifted that the time is constant from the beginning of the acceleration at the start of the shutter release up to that point in time at which the shutter is at its center opening and, for this reason, this time is independent of the exposure time. For this purpose, the start position is derived from the particular required exposure time. This is easily realized in a suitable electronic circuit arrangement in such a form that for each exposure time, the corresponding start position is stored in a data table with the start position being the angular position of the discs or of the drive.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
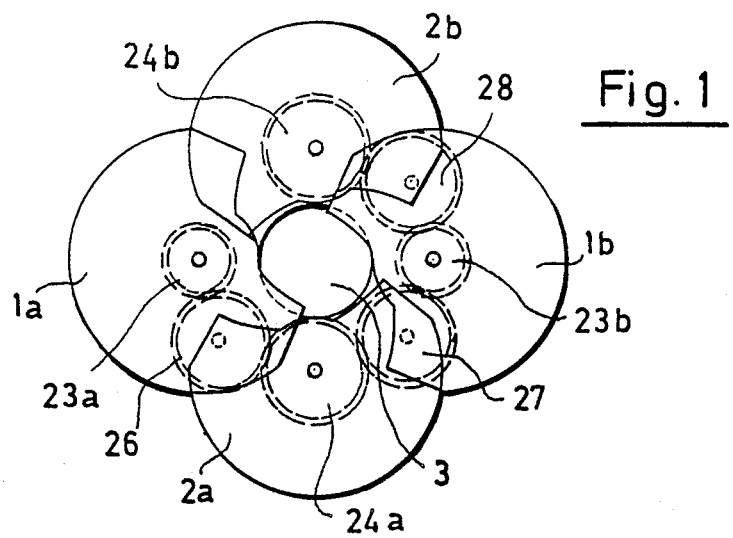
FIG. 1 is a simplified schematic plan view of two disc pairs of the rotary disc shutter.

The shutter shown in FIG. 1 includes two disc pairs (1a, 1b) and (2a, 2b) wherein the discs of each pair rotate at the same speed in a direction opposite to the two discs of the other pair. The two disc pairs (1a, 1b) and (2a, 2b) are connected with each other via a gear transmission such that their speeds are held in a ratio of 2:3. Correspondingly, the two sector-shaped cutouts of the discs (1a, 1b) and (2a, 2b) clear the shutter opening 3 after each three rotations of the disc pair (1a, 1b). The transmission for the disc pairs is shown simplified in FIG. 1 as a spur gear transmission. The spur gears (23a, 23b) and (24a, 24b) for the respective disc pairs (1a, 1b) and (2a, 2b) are coupled with each other via spur gears (26 to 28). The drive motor is not shown in FIG. 1 and is mounted on the shaft of one of the spur gears (26 to 28).

Figure 2:
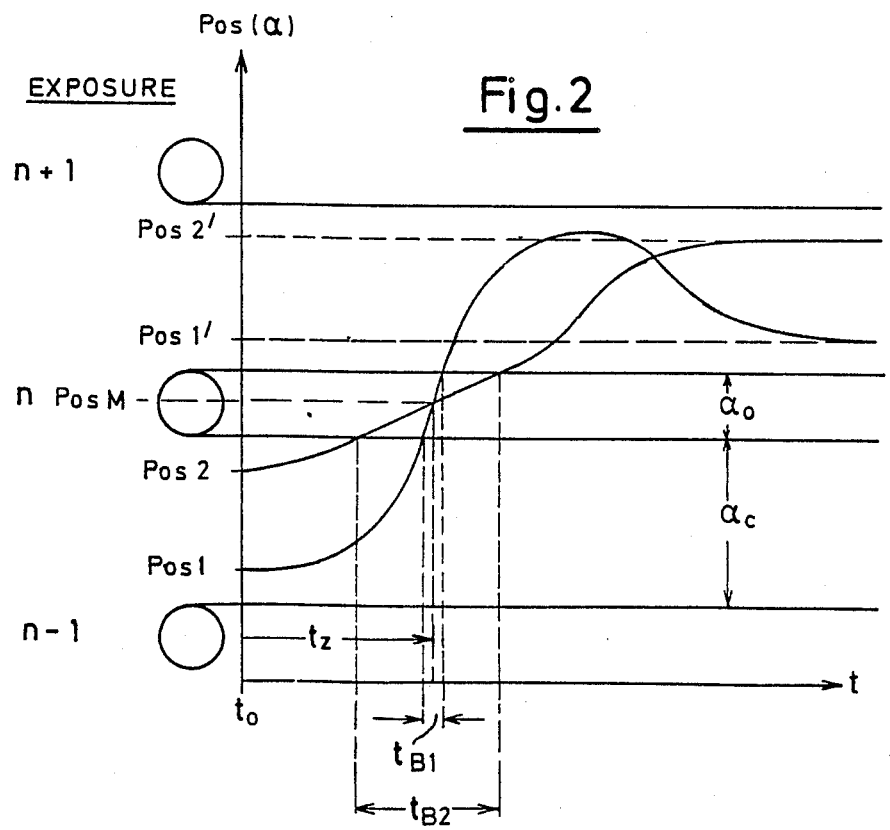
FIG. 2 is a plot of angular displacement as a function of time wherein the course of the rotary discs for two different exposure times is shown; and, FIG. 3 is a block diagram of a control circuit of the shutter according to the invention.

However, and in contrast to the state of the art, the two disc pairs do not rotate continuously; rather, they are accelerated out of standstill from a preset start position up to the velocity which corresponds to the preselected exposure time. This is made clear by the displacement-time curve of FIG. 2. For short exposure times, the shutter starts from an angular position designated as (Pos 1). The position (Pos 1) for the shortest exposure time is so selected that the angular distance to the center position (Pos M) for the shutter opening is just sufficient in order to accelerate the shutter to the speed which corresponds to this exposure time ($t_{B1}$). The time duration needed therefor is the smallest possible access time $t_z$. After passing beyond position Pos M at which the exposure takes place, the disc pairs are again braked and reset to the start position (Pos 1') without a further opening of the sectors of the discs taking place. In the diagram of FIG. 2, the opening region of the shutter is identified by $\alpha_o$ and the closure region is identified by $\alpha_c$.

For longer selected exposure times, the shutter starts, for example, from the position identified in FIG. 2 by Pos 2. This position is so selected that the time which passes until the discs have been accelerated up to the speed required for the exposure time plus the time during which the discs move with this velocity to the center opening Pos M just corresponds to the access time $t_z$. As soon as the exposure operation is ended and the discs again cover the shutter opening 3, the rotary discs are again accelerated so that they reach position Pos 2' as fast as possible from which the next exposure operation is started anew.

Figure 3:
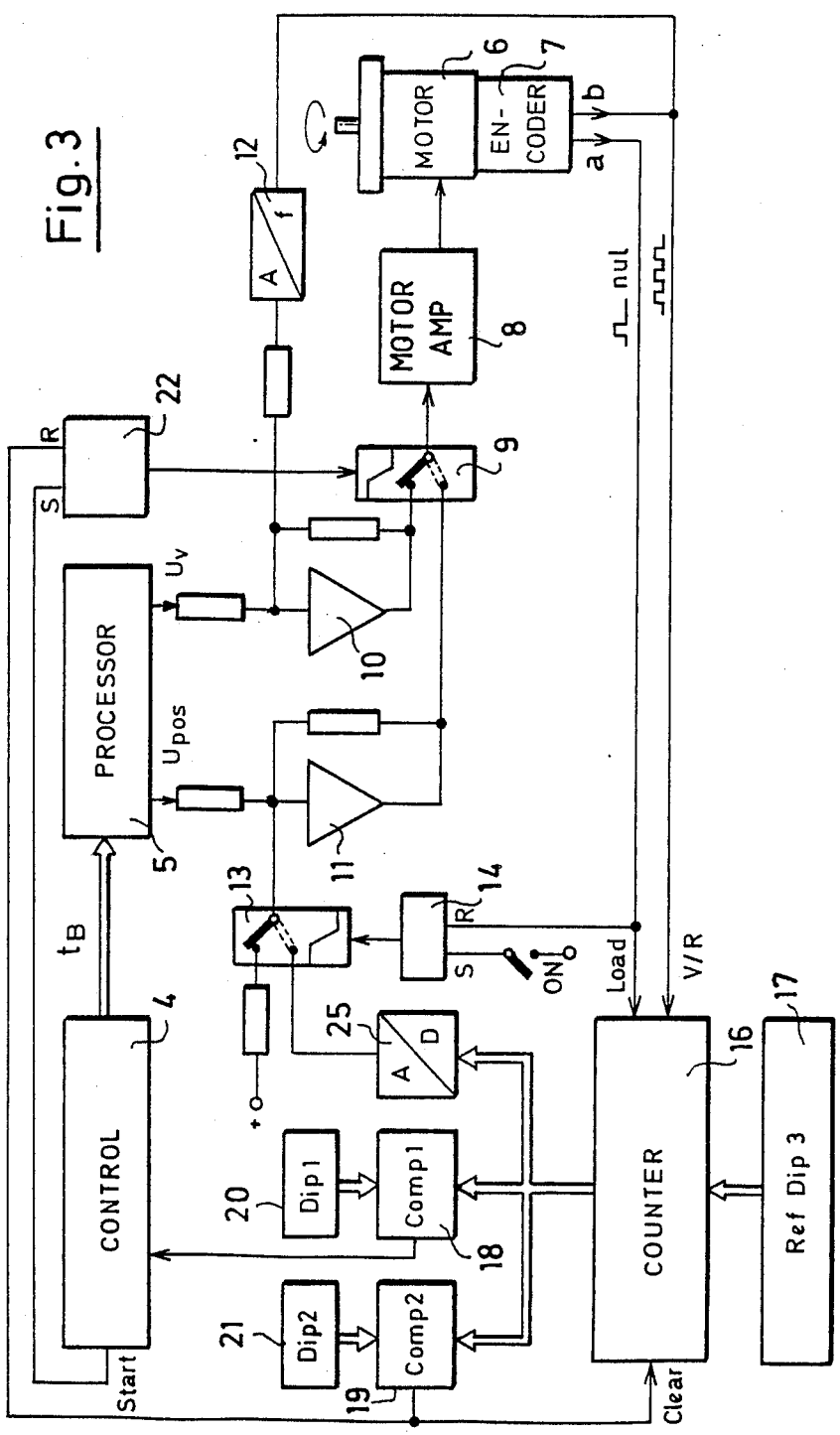

The electronic control arrangement which controls the shutter described above is shown in FIG. 3. Here, reference numeral 4 designates the control for the entire aerial camera. The control 4 includes, for example, an exposure control, the electronics for adjusting the aperture of the aerial camera, the electronics for the film advance and, if required, a device for compensating for image movement. With respect to the shutter of the camera, the control 4 supplies the exposure time $t_B$ which is to be adjusted as well as the start pulses by means of which the shutter is actuated.

The processor 5 is the main unit of the actual shutter control. The processor 5 receives the value of the exposure time $t_B$ which is to be adjusted from the control 4 and computes the start position therefrom for the shutter disc pairs as well as the speed which the shutter pairs must have during the shutter opening. The corresponding values can be stored in a data table of the processor 5 or can be computed from the known equations for a uniformly accelerated movement with the aid of a predetermined firmware program. Two voltages ($U_{pos}$ and $U_v$) are supplied as a result of this computation pursuant to a corresponding digital-to-analog conversion. The voltage $U_{pos}$ is proportional to the angular location in the start position and $U_v$ is proportional to the speed when passing through the shutter opening.

The drive motor 6 for the shutter is provided with an incremental encoder 7. The encoder 7 has two outputs (a) and (b). The incremental counting pulses of the encoder are on output (b); whereas, a zero pulse is supplied on output (a) when passing a mark. This zero pulse initializes the angular measuring system as will be described in the following.

The output of the processor 5 identified with the designation $U_v$, which supplies the voltage corresponding to the desired speed of the shutter, and the output (b) of the encoder 7 are connected into a speed-control loop. For this purpose, the signal $U_v$ is applied to an operational amplifier 10 having an output which is applied to the input of the motor output stage via a changeover switch 9. The frequency of the output pulses of the encoder 7 is converted into an analog voltage in a block 12 and coupled back to the input of the operational amplifier 10. For a correct design of this control loop and after switching the changeover switch 9 into the position shown in the drawing by the solid line, the motor 6 runs out of the rest position at constant acceleration determined by the end stage 8 until the motor reaches the desired speed given by signal $U_v$. From hereon, the motor continues to run uniformly at this desired speed.

The incremental output (b) of the encoder 7 supplies two phase-displace pulse trains which are for direction detection in the conventional manner. The incremental output (b) is furthermore applied to the input of a counter 16. The content of the counter is transformed into an analog voltage in a digital-to-analog converter 25 which is connected downstream of the counter 16. This analog voltage is coupled back to the input of a second operational amplifier 11 via a changeover switch 13.

The voltage $U_{pos}$ is also applied to the input of the operational amplifier 11 and this voltage is proportional to the desired position which is to be adjusted and from which the shutter discs are started from the rest position. The output of the operational amplifier 11 is applied to the second contact of the changeover switch 9. When the changeover switch 9 is switched over into the position shown in phantom outline, a position-control loop is closed via the motor output stage 8, the motor 6, the encoder 7, the counter 16 and the digital-to-analog converter 25 as well as the operational amplifier 11. The position-control loop assures that the shutter discs run into the start position pregiven by $U_{pos}$.

The changeover switch 13 is connected to the operating voltage via a resistor when the switch is in the position shown in the drawing by the solid line. The changeover switch 13 is actuated by the output signal of a gate 14. The switch-on signal with which the electronic control circuit is started for the first time as well as the zero pulse from the output (a) of the encoder 7 are applied to the inputs S and R, respectively, of the gate 14.

The function of this arrangement will now be described. With the first switch-on, the changeover switch 13 is placed in the position shown by the solid line so that the motor 6 in any event starts to run until the zero pulse mark of the encoder 7 which is necessary for initialization is overrun. The zero pulse signal from the output (a) of the encoder 7 is also applied on the load input of the counter 16. As soon as this signal appears, the reference position is read into the counter 16. This reference signal corresponds to the zero pulse mark and is adjusted with the dip switch 17. Thereafter, the changeover switch 18 switches over and closes the position-control loop which is now initialized.

The output of the counter 16 is also connected to two comparators (18, 19) the second inputs of which are connected to respective dip switches (20, 21). The dip switch 20 is adjusted to the position shown in FIG. 2 with the symbol Pos M; that is, to the mean value of the shutter opening. The output of the comparator 18 supplies a signal when the content of the counter 16 corresponds to the value adjusted on dip switch 20; that is, at the exact center time point of the exposure.

A value is adjusted on the dip switch 21 which corresponds to the end of a complete exposure operation. The output signal of the comparator 19 resets the counter 16 via the clear input of the latter.

The output of the comparator 19 is also applied to the input of a gate 22 whose other input is connected with the start output of the control 4. The changeover switch 9 is actuated by the gate 22 and switches between the speed-control loop and the position-control loop. The condition achieved with this switchover is described below.

When the control 4 supplies the start signal for opening the shutter, the changeover switch 9 switches into the speed-control loop and the exposure operation runs its course as described with reference to FIG. 2. After the end of the exposure, a switchover into the position-control loop takes place via comparator 19 and the shutter discs run into the start position with the maximum acceleration predetermined by the current in the motor output stage. The next exposure operation begins at this start position. This movement into the start position can be a forward movement or a return movement in accordance to whether a short or a long exposure time was selected for the shutter. In this connection, reference is made to the explanation afforded by FIG. 2.

A shutter configured in accordance with the embodiment described above can maintain an access time of only 50 ms with a precision of better than ±10% for a range of exposure times between 0.02 second to 0.002 second. For a picture interval time of approximately 1 second, this corresponds to a precision for the overlapping of the pictures of better than 5 per thousand. Since the configuration of the sectors of the discs of this pulse-driven shutter corresponds to those of the conventional disc shutters, the same efficiency is also obtainable with the shutter.

It is understood that the foregoing description is that of the preferred embodiments of the invention and that various changes and modifications may be made thereto without departing from the spirit and scope of the invention as defined in the appended claims.

What is claimed is:

1. A shutter for a photogrammetric camera comprising:
rotatably mounted disc means for defining a shutter opening;
drive means for rotatably driving said disc means for each exposure operation by accelerating said disc means out of a standstill start position thereof;
angle encoder means for measuring said start position of said disc means;
a control circuit for providing a signal indicative of a desired exposure time $t_B$; and,
a device operatively connected to said drive means for displacing said start position of said disc means in dependence upon said signal so as to cause the access time $t_z$ between the start $t_o$ of the acceleration and the exposure for different adjustable exposure times ($t_{B1}$, $t_{B2}$) to have a substantially constant value.

2. The shutter of claim 1, said disc means comprising a plurality of rotatably mounted discs; and, transmission means for interconnecting said discs to each other and to said drive means at different speed ratios.

3. The shutter of claim 2, said transmission means being a gear transmission.

4. The shutter of claim 1, said disc means comprising a plurality of pairs of discs; and, transmission means for interconnecting said disc pairs to each other and to said drive means at different speed ratios.

5. The shutter of claim 4, said transmission means being a gear transmission.

6. The shutter of claim 1, further comprising a control arrangement including a position-control loop and a speed-control loop; and, said device including computer means for computing a preselected desired position value $U_{pos}$ and a preselected desired speed value $U_v$ in correspondence to the desired exposure time $t_B$ and the constant access time $t_z$ and for applying said position value $U_{pos}$ to said position-control loop and said speed value $U_v$ to said speed-control loop.

7. The shutter of claim 6, said control arrangement comprising changeover switching means for switching between said position-control loop and said speed-control loop during each exposure operation.

* * * * *